(12) United States Patent
Chang

(10) Patent No.: US 6,433,964 B1
(45) Date of Patent: Aug. 13, 2002

(54) METHOD OF MAKING HIGH DENSITY RECORDING MEDIUM HAVING A NON-MAGNETIC, METALLIC LAYER ON A FLEXIBLE SUBSTRATE

(76) Inventor: Hao-jan Chang, 3637 Slopeview Dr., San Jose, CA (US) 95148

(*) Notice: Subject to any disclaimer, the term of this patent is extended or adjusted under 35 U.S.C. 154(b) by 0 days.

(21) Appl. No.: 09/691,660

(22) Filed: Oct. 17, 2000

Related U.S. Application Data

(62) Division of application No. 08/896,154, filed on Jul. 16, 1997, now Pat. No. 6,144,525.
(60) Provisional application No. 60/022,094, filed on Jul. 16, 1996.

(51) Int. Cl.[7] ................................................ G11B 23/03
(52) U.S. Cl. .................................... 360/133; 360/135
(58) Field of Search ................................ 360/233, 135

(56) References Cited

U.S. PATENT DOCUMENTS

| | | |
|---|---|---|
| 4,152,485 A | 5/1979 | Mizumura et al. |
| 4,514,452 A | 4/1985 | Tanaka et al. |
| 4,590,119 A | 5/1986 | Kawakami et al. |
| 4,737,877 A | 4/1988 | Krongelb et al. |
| 4,874,668 A | 10/1989 | Asada et al. |
| 5,106,681 A | 4/1992 | Endo et al. |
| 5,377,060 A | 12/1994 | Nigam |
| 5,389,418 A | 2/1995 | Ota et al. |
| 5,549,955 A | 8/1996 | Kawamata et al. |
| 5,556,698 A | 9/1996 | Amirsakis et al. |
| 5,567,523 A | 10/1996 | Rosenblum et al. |
| 5,968,627 A | * 10/1999 | Nigam ........................ 360/135 |

FOREIGN PATENT DOCUMENTS

| | | |
|---|---|---|
| JP | 58115632 | 7/1983 |
| JP | 63241722 | 10/1988 |

* cited by examiner

*Primary Examiner*—A. J. Heinz
(74) *Attorney, Agent, or Firm*—Morrison & Foerster LLP

(57) ABSTRACT

Disclosed is a method of making a high density recording medium having a non-magnetic metallic layer on a flexible substrate, wherein said high density recording medium can be used as a floppy disk with greater data storage capacity. The method involves (a) providing a non-magnetic, metallic layer on the first side and the second side of the flexible substrate to form a non-magnetic, metallic flexible substrate, and (b) placing a data recording layer over said non-magnetic metallic layer on said first side and said second side, such that said non-magnetic, metallic flexible substrate comprises a non-metallic core and non-magnetic, metallic layers over both said first and said second sides of said non-metallic core; and wherein said data recording layer comprises a material selected from the group consisting of a magnetic data recording material and a magneto-optical data recording material having a coercivity of at least 1200 Oersted.

8 Claims, 2 Drawing Sheets

METHOD OF MAKING HIGH DENSITY RECORDING MEDIUM HAVING A NON-MAGNETIC, METALLIC LAYER ON A FLEXIBLE SUBSTRATE

This invention is a divisional of U.S. patent application Ser. No. 08/896,154, filed on Jul. 16, 1997 now U.S. Pat. No. 6,144,525 which claims priority to U.S. Provisional Application No. 60/022,094, filed Jul. 16, 1996.

FIELD OF THE INVENTION

The invention provides a high-density floppy disk for use in data storage, wherein the substrate is a flexible metallic substrate.

BACKGROUND OF THE INVENTION

Magnetic recording media such as floppy disks have been used for recording data used in computers for a number of years. As software has become more complex, the amount of information to be stored on magnetic storage media has increased dramatically. Floppy disks have previously been used to store this data. However, floppy disks are limited in the amount of information that they can store, and it is desirable to increase the storage capacity or density of floppy disks.

Non-uniform thermal expansion or contraction of the data disk limits the amount of data that can be placed on a floppy disk. Available data disks expand at different rates along different radii of the disk. The disk and its tracks assume an elliptical shape as the environment (such as temperature and humidity) changes, and the read/write head cannot follow the elliptically-shaped on the disk. Thus, tracks in which data is stored have to be wide so that the read/write head sweeps a circular path within a track and locates data despite eccentricities in the shape of the track caused by non-uniform thermal expansion of the disk.

Floppy disks are typically made by coating a polymeric substrate of a polyester such as Mylar® or polyethylene terephthalate with a magnetic material which records data received from a magnetic recording head. The polymeric material used to make the substrate is typically an oriented polymer that is stretched in one direction so that the long chain molecules of the polymer orient themselves in a particular direction. The long-chain molecules of the oriented polymer become oriented due to the way the substrate is manufactured. A thick sheet of the polymer is stretched longitudinally and is either held in place laterally or stretched laterally (but stretched less laterally than longitudinally) until the thickness of the sheet reaches the desired thickness. Because of this stretching in predominantly one direction, the long-chain polymer molecules orient themselves primarily in the direction in which the polymer sheet was pulled most.

These oriented polymers are sensitive to environmental e.g., temperature, and humidity changes. For example, as the temperature increases or decreases, the polymer expands or shrinks. The oriented polymer expands or shrinks at a different rate in the direction of orientation than it expands or shrinks in a direction perpendicular to the direction of orientation.

Because portions of the substrate expand or shrink at different rates, it is difficult to retrieve data from a particular location. Changes in temperature affect the location of the data, and consequently, a wider data track has to be provided so that the read/write head can locate the data despite the track having an eccentric shape. As a result of this, data cannot be packed too closely on a floppy disk, and lower storage capacities than what can be achieved result. As more storage capacity on a floppy disk is needed, it is increasingly important to provide a substrate that does not suffer the shrinkage and expansion that an oriented polymer such as PET suffers.

Further, it is necessary to limit the amount of expansion with change in temperature. As shown in Table 1, a polyester has a high coefficient of linear thermal expansion. It is desirable to limit the amount of linear expansion so that a data head can accurately locate data on a disk.

It is therefore an object of this invention to provide a high-density data recording medium with essentially uniform expansion and contraction in all directions across the medium, thereby providing it with greater dimensional stability.

It is another object of the invention to provide a floppy disk that has greater data storage capacity than is provided by currently-available floppy disks. Other objects and advantages are apparent from the discussion herein.

SUMMARY OF THE INVENTION

The invention provides a high-density data recording medium for use in a floppy disc, the invention provides a high-density floppy disk, and the invention also provides methods for making a high-density data recording medium and a high-density floppy disk.

In one embodiment of the invention, the invention comprises a high-density recording medium for use in a floppy disk. The high-density recording medium comprises a metallic substrate and a data recording layer, wherein the metallic substrate is a non-ferrous metallic substrate or a non-magnetic metallic substrate. The data recording layer can be, for example, a magnetic data-recording layer or a magneto-optical data recording layer. The metallic substrate is sufficiently thin that the substrate flexes when contacted by a data head of a floppy disk drive when the high-density recording medium is incorporated into a high-density floppy disk, but the metallic substrate has sufficient strength that the metallic substrate is not permanently deformed by this contact. The metallic substrate also has sufficient mechanical properties such as hardness for use as e.g. a recording medium for a floppy disk.

In another embodiment of the invention, the invention comprises a high-density recording medium which comprises a metallic substrate and a data recording layer, wherein the metallic substrate comprises a non-metallic core and a metallic layer. The metallic layer is a non-ferrous metallic material or a non-magnetic metallic material. The metallic layer has a sufficient thickness and strength to prevent the non-metallic core from expanding significantly more in one direction (e.g. the direction of orientation of polymer molecules in a polymeric core) than in another direction (e.g. a direction perpendicular to the direction of orientation of the polymer molecules).

The invention also provides a floppy disk comprising a casing and a high-density recording medium as described above.

The invention also provides methods for making a high-density recording medium. One such method comprises (a) providing a flexible, disk-shaped substrate made of a material which expands at substantially the same rate along all radii of the disk-shaped substrate with a change in temperature, and (b) placing a data recording layer over the disk-shaped substrate.

Among other factors, the invention is based on the technical finding that a floppy disk made using a metallic substrate as described herein has greater dimensional stability so that data tracks remain essentially circular or annular despite changes in temperature and humidity, so that tracks can be made narrower and more data can be placed on the surface of the floppy disk. These and other technical findings and advantages are apparent from the discussion herein.

DETAILED DESCRIPTION OF THE PREFERRED EMBODIMENT

Figure 1:
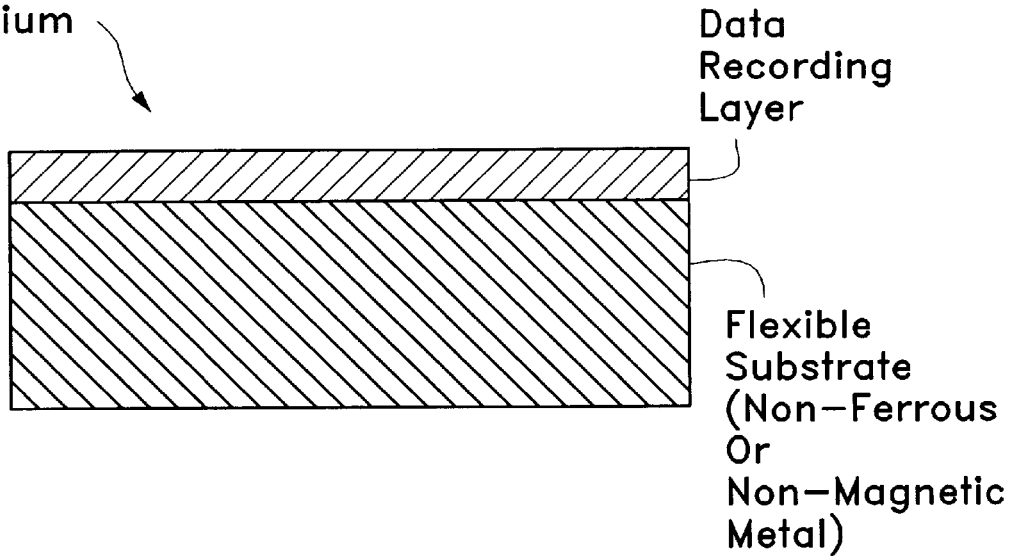
FIGS. 1 and 2 illustrate high-density data recording media having a non-ferrous or non-magnetic metal core.
Figure 2:
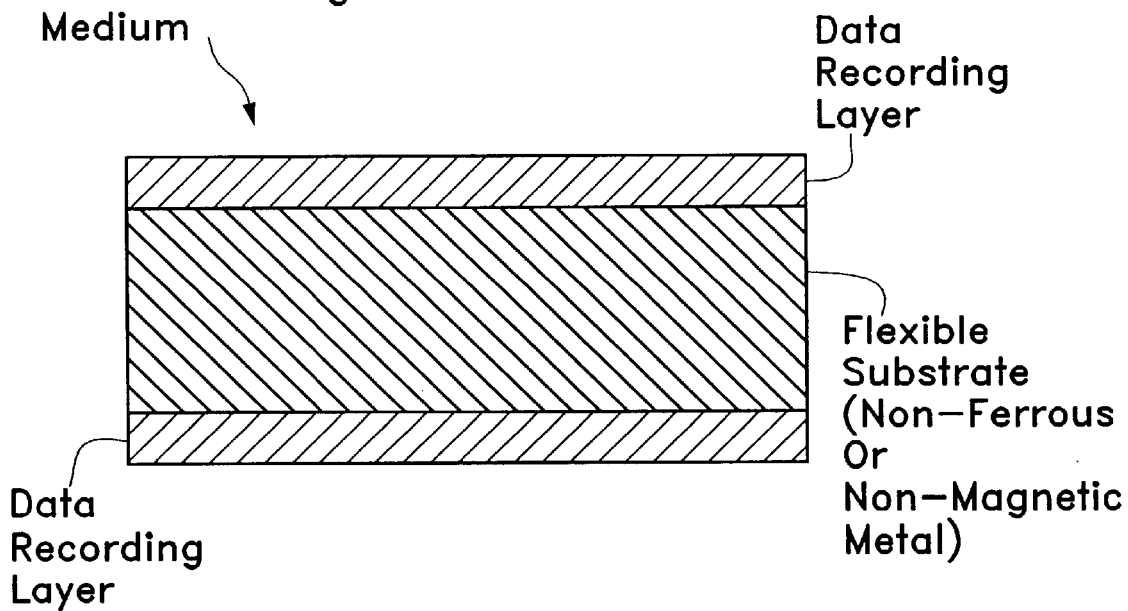

In one embodiment of the invention, the invention provides a high-density data recording medium for use in a floppy disk. ZAs illustrated in FIGS. 1 AND 2, the high-density data recording medium comprises a metallic substrate and a data-recording layer.

The metallic substrate is a disk made of a non-ferrous or metal alloy. Alternatively, the metallic substrate is a disk made of a non-magnetizable metal or alloy. The metal or alloy has properties which allow it to be used in a floppy disk. Thus the thickness and size of the disk are selected to be appropriate for use in a floppy disk. Also, such properties as the tear strength, tensile strength, hardness, and other properties that make the disk appropriate for use in a floppy disk are selected so that the metal disk can rotate at the appropriate speed, and so that the read/write head of the disk drive can contact and ride across the surface of the disk without permanently deforming the surface of the disk. The thickness of the disk is preferably between 0.0005 inches and 0.009 inches, and more preferably is between about 0.001 inches and 0.004 inches. The disk also has a diameter of an appropriate size for use in a floppy disk (e.g., 3½ inches, 5¼ inches, 2½ inches, 2 inches or 1 inch). Preferred materials include such metals as copper, tin, zinc, and gold, and alloys of these materials such as brass or bronze. If a soft material such as silver or aluminum or zinc is used as shown in Table 1, this material must be coated with a harder material to prevent the data head from permanently deforming the material. Silver or aluminum can be coated with chromium, for example, to provide a metallic substrate suitable for use in this invention.

As shown in Table 1, these metals also have a lower coefficient of linear thermal expansion than polyester. A data recording medium having a metallic substrate expands and shrinks less than e.g. polyester expands and shrinks, which allows data tracks to be narrower and allows greater data density on the data recording medium.

The data recording layer can be a magnetic data recording medium made from e.g. particulate ferromagnetic material. Preferably, the data recording layer has a coercivity between about 800 Oe. and 4500 Oe., and preferably the coercivity is at least about 1200 Oe. The particulate ferromagnetic material is combined with other components such as polymeric binder resin; a hardening agent; a surfactant; a lubricant; carbon black; an anti-static agent; and other additives common to such data recording layers. Typical ferromagnetic materials include iron and iron oxide as well as Fe—Co, Fe—Ni, and Fe—Ni—Co alloys in random particle shapes or e.g. platelet-shaped.

Because the disk is a metallic material such as a non-ferrous or non-magnetizable metal or alloy, the data recording layer may instead be vacuum-deposited on to the surface of the disk. Sputtering allows a continuous, even layer of e.g. a magnetic data recording medium to be deposited on the surface of the substrate. A floppy disk having a thin, sputtered or vacuum deposited data recording layer will hold significantly more data than a floppy disk made with a particulate magnetic material. Thus, a floppy disk made using a metallic substrate of this invention as described in this paragraph gains a substantial amount of data storage capacity from narrower tracks made possible by the uniform expansion of the substrate and the thinner layer of magnetic recording medium that can be deposited over the metallic substrate.

The high density data recording medium may also have other layers placed upon it. For instance, a protective or lubricating layer may be placed over the data recording layer. Such layers include common lubricants such as oligomers of fluorocarbons, fluorinated silicones, and silicon oils and/or protective or anti-static ingredients such as graphite, hardened carbon, carbon black, and other components known to those of ordinary skill in the art.

Figure 3:
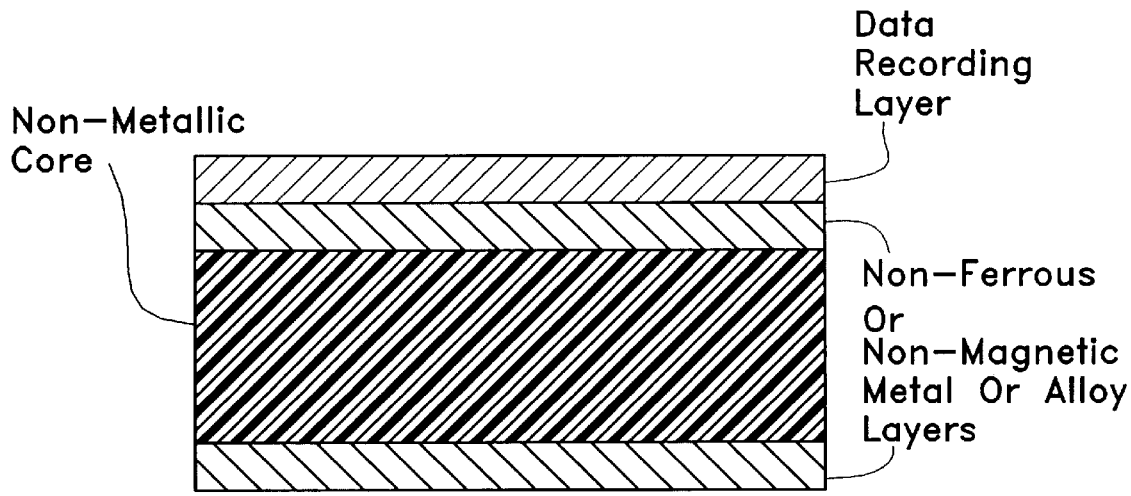
FIGS. 3 and 4 illustrate high-density recording media having a non-metallic core and a non-ferrous or non-magnetic metal or alloy layer.
Figure 4:
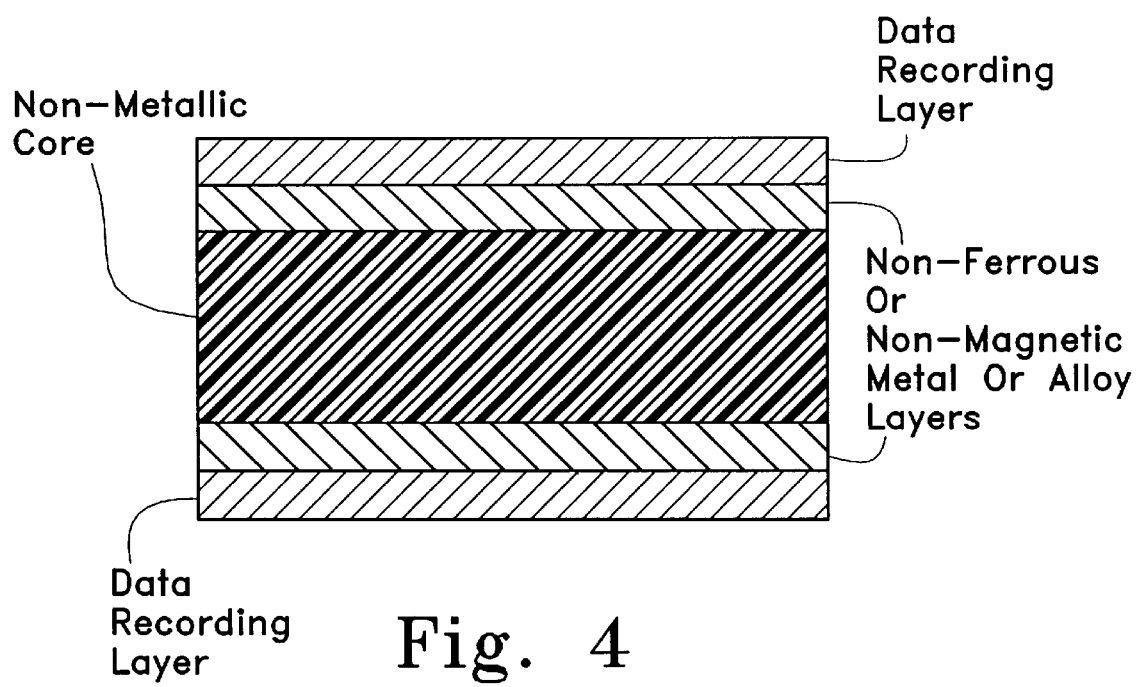

Instead of using a metallic material such as metal or an alloy to form the metallic substrate, the substrate may instead be formed using a core of a non-metallic material such as an oriented polymer and a metallic layer as illustrated in FIGS. 3 and 4. Suitable non-metallic materials include polymeric films such as polyester, polyimide, polyamide, or other polymers with sufficiently high glass transition temperature or melting point. The metallic layer comprises a non-ferrous metal or alloy or a non-magnetic metal or alloy as described previously. The layer is sufficiently thick and strong that the metallic substrate incorporating the layer experiences a substantially equal thermal expansion along any radius drawn from the center of the disk. Thus, the metallic layer maintains the annular shape of the data tracks better than the core material alone can and thus allows narrower and more data tracks to be provided on the high-density data recording medium. The metal layer prevents the oriented polymer from having uneven expansion due to temperature changes. The metal layer limits how much the core can expand in any direction, thus limiting the core's freedom to expand more in one direction than another. In this way, the circular data tracks are maintained substantially circular rather than distorting into an elliptical shape as would occur if the metal layer was not present on the substrate. Preferably, the non-metallic core is between about 0.0005 and 0.008 inches thick and more preferably is between about 0.001 and 0.004 inches thick. The metallic layer is preferably between about $1 \times 10^{-6}$ and $100 \times 10^{-6}$ inches thick and more preferably is between about $3 \times 10^{-6}$ and $30 \times 10^{-6}$ inches thick. The metallic layer may be coated onto the non-metallic core on only one side of the non-metallic core or on both sides of the non-metallic core.

The non-metallic core may be a polymeric film such as a polyimide, polyamide, or polyester such as polyethylene terephthalate coated on both sides and can be coated on both sides with a layer of non-ferrous or non-magnetizable metal.

The data-recording layer may be formed over the metallic substrate a number of ways. A web of the metallic substrate having an adhesive layer thereon may be coated with a mixture of the components which form the data-recording layer by a number of commonly known wet coating methods, such as a knife, roll, gravure, extrusion, or other means. The mixture is magnetically oriented, dried and calendered to form the data-recording layer, and subsequently disks are punched from the processed web. Alternatively, disks may be punched from a web of metallic substrate and coated with the mixture, which is magnetically oriented, dried and calendered or polished to form the data-recording layer and the high-density data storage medium. The web or disks punched from the web of metallic substrate may alternatively be sputtered or vacuum deposited with e.g. a magnetic material to form a magnetic data-recording layer on or over the web or disks.

Preferably, the metallic substrate is used to make a flexible carrier as described in copending U.S. patent application entitled "FLEXIBLE HIGH-DENSITY RECORDING MEDIA," inventor Hao-Jan Chang, filed on even date herewith and the disclosure of which is incorporated by reference herein in its entirety. The flexible carrier has a carbon black composite layer which provides a smooth surface upon which the metallic layer is deposited. The smooth surfaced carbon black composite layer allows a very thin layer of the data-recording medium to be deposited on its surface. A floppy disk made from this high-density recording medium has a higher data storage capacity than a floppy disk made without the carbon black composite layer.

Some methods of making the high-density data recording medium of this invention are described in the copending application entitled "FLEXIBLE HIGH-DENSITY RECORDING MEDIA," inventor Hao-Jan Chang, filed on even date herewith. One method comprises coating a roll of the metallic substrate with a layer of an adhesive and subsequently forming a carbon black composite layer on the metallic substrate. The carbon black composite layer is calendered with sufficient force to provide a smooth, shiny surface on the carbon black containing layer. The magnetic data-recording layer is deposited on to the processed substrate, and the coated roll is then dried, calendered and punched into round disks. The disks are then encased in floppy disk casings to form floppy disks.

As noted above, the high-density data recording medium can be housed in a casing to form a floppy disk. The casing has a size and shape sufficient to allow insertion into a floppy disk drive. Common floppy disks include the 3½ inch, the 5¼ inch, and smaller 2½ inch, 2 inch, and 1 inch disks.

There are a number of methods of making the high-density data recording medium of this invention. One method involves coating a web of metallic material with a material which forms the data-recording layer and subsequently punching the disks out of the coated web. A web is often formed in a similar manner to how an oriented polymer is formed. A roll of thick metal or alloy is heated, pulled in one direction, and rolled through large rollers to reduce the thickness of the metal or alloy to the desired thickness. Where a polymer roll would become oriented if processed in this manner, a roll of metal or alloy is not oriented when processed this way. The metal or alloy material does not contain significant amounts or any long-chain molecules, so the components which comprise the metal or alloy material cannot align in the direction in which the roll is pulled.

A second method of making the high-density recording medium of this invention involves first punching the disks out of a metallic web, processing the disks, and subsequently coating the disks to form the data-recording layer. A third method involves punching the disks from a metallic web and sputtering or vacuum depositing the data-recording layer on to the surface of the metallic disk. The web may also be a non-metallic core coated with a metallic layer as described previously.

Prior to depositing the data-recording medium onto the metallic substrate, the surface of the metallic substrate may be physically treated by e.g. polishing or burnishing the surface to make it smooth and receptive to the data-recording medium. An adhesive or subcoat(s) may also be applied to the surface of the metallic substrate to aid in adhering the data-recording layer to the substrate.

When depositing a particulate ferro-magnetic material, a slurry is prepared by mixing and milling ingredients such as magnetic metal particles having a coercivity between 800 Oe. and 4500 Oe. with a polymeric binder resin, a hardening agent, a solvent, a surfactant, a lubricant, carbon black, and/or other common additives. Particulate magnetic material is usually spun-coated on to the prepared substrate.

U.S. Pat. No. 5,549,955 describes components that can be used in the data-recording layer and other layers of the high-density data recording medium of this invention, and this patent also describes methods of processing and applying these components to a substrate or layer on the substrate. The disclosure of this patent is incorporated by reference herein to the extent that such disclosure does not conflict with the disclosure contained in this application and in copending application "FLEXIBLE HIGH-DENSITY RECORDING MEDIA," inventor Hao-Jan Chang, filed on even date herewith. Adhesives suitable for use in this invention include those discussed below in the examples and other polymeric resins such as vinyl, epoxy, urethane, and acrylic polymers with polar or ionic groups. Examples include polyurethane or polyester having metal sulfonate groups or aminoalkylphosphonate groups. See U.S. Pat. Nos. 4,152,485 and 5,556,698 which are incorporated by reference herein. The number of layers between the surface of the metal of the metallic substrate and the data recording layer typically varies between zero and three. These layers are used for smoothing the surface or promoting adhesion as well as for other purposes known to those in the art.

The following examples are illustrative embodiments of the invention. These examples as well as the description of the preferred embodiment are not limiting of the scope of the invention but are instead intended to provide examples of particular embodiments of the claimed invention. Thus, the claims are to be given their broadest interpretation that is consistent with the disclosure herein and the prior art.

EXAMPLES

Example 1

A brass sheet 3 feet by 6 inches and having a thickness of 0.002 inch was coated with an adhesive material composed of 12% of a polyvinyl chloride derivative ("VAGH") in cyclohexanone. A ferromagnetic material mixture having the following composition was coated onto the adhesive material:

| | |
|---|---|
| polyurethane | 18 parts |
| VAGH | 6 parts |
| butoxyethyl stearate | 6 parts |
| Centralex-P/Gafac | 8 parts |
| Mondour CB-752 | 8 parts |

Example 2

A brass sheet 3 feet by 6 inches and having a thickness of 0.002 inch was coated with an adhesive material composed of 12% of an epoxy resin available under the trade name of PKHJ (available from Union Carbide) in cyclohexanone. A ferromagnetic material mixture having the following composition was coated onto the adhesive material:

| | |
|---|---|
| polyurethane | 14 parts |
| PKHJ | 7 parts |
| butoxyethyl stearate | 8 parts |
| Mondour CB-752 | 8 parts |
| Vulcan XC-72R | 3 parts |

TABLE 1

Thermal & mechanical properties:

| | Properties | | | | |
|---|---|---|---|---|---|
| | Melting point ° C. | Coefficient of linear thermal expansion $10^{-6}$ in/in ° C. | Young's modulus E $10^6$ psi | Bulk modulus K $10^6$ psi | Shear modulus G $10^6$ psi |
| PET | 212–265 | 65 | 0.4–0.6 | | |
| Al (Aluminum) | 660 | 23.6 | 10.2 | 10.9 | 3.8 |
| Ag (silver) | 960 | 19.68 | 12.0 | 15.0 | 4.39 |
| Zn (Zinc) | 419.5 | 39.7 | 15.2 | 10.1 | 6.08 |
| Brass | — | — | 14.6 | 16.2 | 5.41 |
| Cu (copper) | 1083 | 16.5 | 18.8 | 20.0 | 7.01 |
| Fe (iron) | 1537 | 11.76 | 30.7 | 24.6 | 11.8 |
| Ni (Nickel) | 1453 | 13.3 | 28.9 | 25.7 | 11.0 |
| Co (cobalt) | — | 13.8 | — | — | — |
| Cr (Chromium) | 1875 | 6.2 | 40.5 | 23.2 | 16.7 |

Note:
1. Data for PET (polyester) is from "Modem Plastics, Special Buyer's Guide 94"; PET is known as raw material for conventional substrate for most of the current flexible recording media. PET is not polycrystalline as metals are and PET is far less rigid than any metal shown above, in addition to other drawbacks.
2. Remainder of data is obtained from a Handbook of "American Society of Metals," desk edition, 1985, edited by Howard Boyer and Tim Gall.
3. Aluminum (Al) seems to be the least rigid among the metals listed in the above table.

What is claimed is:

1. A method for making a high density recording medium having a non-magnetic, metallic layer on a flexible substrate having a first side and a second side, wherein said method comprises (a) providing a non-magnetic, metallic layer on the first side and the second side of the flexible substrate to form a non-magnetic, metallic flexible substrate, and (b) placing a data recording layer over said non-magnetic metallic layer on said first side and said second side, such that said non-magnetic, metallic flexible substrate comprises a non-metallic core and non-magnetic, metallic layers over both said first and said second sides of said non-metallic core; and wherein said data recording layer comprises a material selected from the group consisting of a magnetic data recording material and a magneto-optical data recording material having a coercivity of at least 1200 Oersted.

2. The method of claim 1, wherein the non-magnetic, metallic flexible substrate comprises an orientated polymer core and said non-magnetic, metallic layers over the first and second sides of the polymer core; wherein said polymer core has a thickness between 0.0005 inch and 0.008 inch, and where said non-magnetic, metallic layer has a thickness between 0.000001 inch and 0.000100 inch.

3. The method of claim 1, wherein the step of placing the data recording layer over said non-magnetic, metallic layer comprises vacuum depositing said material on said non-magnetic metallic layers, and wherein said material is selected from the group consisting of a ferromagnetic data recording material and a magneto-optical data recording material.

4. The method of claim 1, wherein the flexible substrate is disk-shaped, and wherein said method further comprises (c) placing said non-magnetic, metallic flexible substrate having said data recording layer produced by steps (a) and (b) within a floppy diskette casing configured so that said non-magnetic, metallic flexible substrate having said data recording layer can be read and written by a recording head of a floppy disk drive.

5. A product made by the method of claim 1.
6. A product made by the method of claim 2.
7. A product made by the method of claim 3.
8. A product made by the method of claim 4.

* * * * *